(12) United States Patent
Hallamaa et al.

(10) Patent No.: US 8,392,545 B2
(45) Date of Patent: Mar. 5, 2013

(54) DEVICE MANAGEMENT SYSTEM

(75) Inventors: Mika Hallamaa, Tampere (FI); Mikko Sahinoja, Tampere (FI); Eero Kaappa, Tampere (FI)

(73) Assignee: Nokia Corporation, Espoo (FI)

( * ) Notice: Subject to any disclaimer, the term of this patent is extended or adjusted under 35 U.S.C. 154(b) by 1685 days.

(21) Appl. No.: 10/966,747

(22) Filed: Oct. 15, 2004

(65) Prior Publication Data

US 2006/0015626 A1 Jan. 19, 2006

Related U.S. Application Data

(60) Provisional application No. 60/585,465, filed on Jul. 1, 2004.

(51) Int. Cl.
*G06F 15/173* (2006.01)
*G06F 13/00* (2006.01)

(52) U.S. Cl. ....................................... 709/223; 711/100

(58) Field of Classification Search .................. 709/223
See application file for complete search history.

(56) References Cited

U.S. PATENT DOCUMENTS

| | | | |
|---|---|---|---|
| 5,771,381 A | 6/1998 | Jones et al. | |
| 5,845,090 A | 12/1998 | Collins, III et al. | |
| 5,960,214 A | 9/1999 | Sharpe, Jr. et al. | |
| 5,974,454 A | 10/1999 | Apfel et al. | |
| 6,104,868 A * | 8/2000 | Peters et al. | 709/202 |
| 6,262,726 B1 | 7/2001 | Stedman et al. | |
| 6,266,694 B1 | 7/2001 | Duguay et al. | |
| 6,363,421 B2 * | 3/2002 | Barker et al. | 709/223 |
| 6,426,959 B1 * | 7/2002 | Jacobson et al. | 370/468 |
| 6,512,526 B1 | 1/2003 | McGlothlin et al. | |
| 6,571,245 B2 | 5/2003 | Huang et al. | |
| 6,721,881 B1 | 4/2004 | Bian et al. | |
| 6,728,750 B1 | 4/2004 | Anderson et al. | |
| 1,096,650 A1 | 10/2004 | Hallamaa et al. | |
| 1,096,674 A1 | 10/2004 | Hallamaa et al. | |
| 6,879,982 B2 | 4/2005 | Shirasaka | |
| 7,017,071 B2 * | 3/2006 | Katayama et al. | 714/4.4 |
| 7,024,471 B2 | 4/2006 | George et al. | |
| 7,039,858 B2 | 5/2006 | Humpleman et al. | |
| 7,051,101 B1 * | 5/2006 | Dubrovsky et al. | 709/225 |
| 7,155,521 B2 | 12/2006 | Lahti et al. | |
| 7,392,512 B2 * | 6/2008 | Zhu | 717/144 |
| 7,530,024 B2 | 5/2009 | Takahashi et al. | |
| 7,603,667 B2 | 10/2009 | Lee et al. | |
| 7,676,448 B2 | 3/2010 | Henderson et al. | |
| 7,716,276 B1 | 5/2010 | Ren et al. | |
| 2002/0013855 A1 * | 1/2002 | Ishii et al. | 709/237 |
| 2003/0046381 A1 | 3/2003 | Mokuya et al. | |

(Continued)

FOREIGN PATENT DOCUMENTS

| | | |
|---|---|---|
| EP | 1 515 571 A2 | 3/2005 |
| WO | WO 2004/046858 A2 | 6/2004 |

OTHER PUBLICATIONS

Office Action from U.S. Appl. No. 10/966,745, dated Mar. 31, 2008, 18 pages.

(Continued)

*Primary Examiner* — Guang Li
(74) *Attorney, Agent, or Firm* — Harrington & Smith

(57) ABSTRACT

The invention relates to a method for arranging service management in a service management system, the method comprising: defining one or more device management commands on the basis of predetermined mapping instructions and a service management command, transmitting the device management commands to a managed device, specifying in the managed device one or more service management commands on the basis of the received device management commands, and carrying out the defined one or more device management commands.

26 Claims, 4 Drawing Sheets

U.S. PATENT DOCUMENTS

| | | | |
|---|---|---|---|
| 2003/0078959 A1* | 4/2003 | Yeung et al. | 709/201 |
| 2003/0172046 A1 | 9/2003 | Scott | |
| 2003/0204612 A1* | 10/2003 | Warren | 709/230 |
| 2003/0204640 A1 | 10/2003 | Sahinoja et al. | |
| 2004/0028068 A1* | 2/2004 | Kizhepat | 370/420 |
| 2004/0083472 A1 | 4/2004 | Rao et al. | |
| 2004/0103214 A1* | 5/2004 | Adwankar et al. | 709/246 |
| 2004/0111315 A1 | 6/2004 | Sharma et al. | |
| 2004/0139240 A1* | 7/2004 | DiCorpo et al. | 710/3 |
| 2005/0015477 A1* | 1/2005 | Chen | 709/223 |
| 2005/0039178 A1 | 2/2005 | Marolia et al. | |
| 2005/0060507 A1* | 3/2005 | Kasako et al. | 711/162 |
| 2005/0144270 A1* | 6/2005 | Takase et al. | 709/223 |
| 2005/0228847 A1 | 10/2005 | Hayes, Jr. | |
| 2005/0232175 A1 | 10/2005 | Draluk et al. | |
| 2005/0272455 A1 | 12/2005 | Oommen | |
| 2006/0010232 A1* | 1/2006 | Page et al. | 709/223 |
| 2007/0190939 A1* | 8/2007 | Abel | 455/41.2 |
| 2008/0025239 A1 | 1/2008 | Bossoli et al. | |

OTHER PUBLICATIONS

Office Action from U.S. Appl. No. 10/966,745, dated Jan. 7, 2009, 24 pages.

Office Action from U.S. Appl. No. 10/966,745, dated Sep. 16, 2009, 25 pages.

Office Action Response from U.S. Appl. No. 10/966,745, dated Sep. 30, 2008, 16 pages.

Office Action Response from U.S. Appl. No. 10/966,745, dated Jul. 7, 2009, 24 pages.

Office Action Response from U.S. Appl. No. 10/966,745, dated Feb. 16, 2010, 16 pages.

Office Action from U.S. Appl. No. 10/966,503, dated Mar. 17, 2008, 15 pages.

Office Action from U.S. Appl. No. 10/966,503, dated Oct. 28, 2008, 10 pages.

Office Action Response from U.S. Appl. No. 10/966,503, dated Jul. 16, 2008, 19 pages.

Office Action Response from U.S. Appl. No. 10/966,503, dated Jan. 22, 2010, 23 pages.

Open Mobile Alliance: "SyncML Device Management Protocol", Version 1.1.2, Dec. 12, 2003, pp. 1-41.

OMA Device Management Working Group, "State Machine and Primitives for Service Life Cycle Management", May 17, 2004.

OMA Device Management Working Group, "Service Life Cycle Management", Apr. 19, 2004.

Open Mobile Alliance, "SyncML Device Management Tree and Description", Version 1.1.2, Jun. 12, 2003.

Open Mobile Alliance, "SyncML Representation Protocol Device Management Usage", Version 1.1.2, Jun. 12, 2003.

Open Mobile Alliance, "SyncML Device Management Protocol", Version 12, Jun. 12, 2003.

Office Action from U.S. Appl. No. 10/966,745, dated Jul. 26, 2010, 14 pages.

Office Action from U.S. Appl. No. 10/966,503, dated Oct. 1, 2010, 12 pages.

Office Action Response from U.S. Appl. No. 10/966,745, dated Oct. 14, 2010, 13 pages.

File History for U.S. Appl. No. 10/966,503 as retrieved from the U.S. Patent and Trademark Office PAIR System on May 12, 2011, 207 pages.

File History for U.S. Appl. No. 10/966,745 as retrieved from the U.S. Patent and Trademark Office PAIR System on May 12, 2011, 292 pages.

\* cited by examiner

DEVICE MANAGEMENT SYSTEM

RELATED APPLICATIONS

This application claims the benefit of the U.S. Provisional Application No. 60/585,465, filed Jul. 1, 2004, the content of which is incorporated by reference in its entirety.

FIELD OF THE INVENTION

The invention relates to device management systems, more specifically to arranging service management for a managed device.

BACKGROUND OF THE INVENTION

As different data processing devices, such as mobile stations, become more complex, the significance of device management becomes more pronounced. Devices require several different settings, such as settings related to Internet access points, and setting them manually by the user is arduous and difficult. To solve this problem, for instance, device management solutions have been developed so that the administrator of a company's information system or a teleoperator can set an appropriate configuration for a device. Device management generally refers to actions by which a person typically not using a device can change the configuration of the device; for instance change the settings used by the device. In addition to device-specific settings, it is also possible to transmit user-specific data, such as user profiles, logos, ringing tones, and menus with which the user can personally modify the settings of the device, or the modification takes place automatically in connection with device management.

One of the device management standards is OMA (Open Mobile Alliance) DM (Device management), which is partly based on the SyncML (Synchronization Markup Language) protocol. For instance, a personal computer (PC) can act as a device management server in a device management protocol and a mobile station as a device management client. In terms of device management, the device management client, possibly on the basis of a triggering message from the device management server, transmits information concerning itself in a session initiation message to the device management server, and the device management server replies by transmitting its own information and server management commands. The device management client replies to these with status information, after which the server can end the session or transmit more server management commands. If the server transmits more server management commands, the client is to reply to them with status information. The server can always, after receiving status information, end the session or continue it by transmitting more server management commands. Device management can also be implemented by first transmitting queries to the user about what (s)he wishes to update, and information on the user's selections is transmitted to the server. Next, the server can in the next packet transmit the updates/commands the user desires.

As the number of functions on mobile handsets continues to grow, users find it increasingly difficult to configure their devices to be capable to connect or utilize services. As more services and software applications are implemented in mobile devices, a need for remote management can only grow.

Current device management systems enable manipulation of application and device specific configuration parameters, i.e. configuration management. In addition to configuration management, a need also exists for more sophisticated management capabilities enabling management of larger entities, for instance software management.

BRIEF DESCRIPTION OF THE INVENTION

A method, data processing devices, computer programs, and data storage mediums are provided, which are characterized by what is stated in the independent claims. Some embodiments of the invention are described in the dependent claims.

According to an aspect of the invention, a service management arrangement is provided, wherein the service management arrangement is bound to a device management framework in order to implement high-level service management commands. Mapping instructions are stored in the system, on the basis of which one or more device management commands are defined for carrying out a management task indicated in a service management command. The managed device comprises means for specifying one or more service management commands on the basis of the one or more received device management commands, and means for carrying out the defined one or more device management commands.

Service management generally refers to any capability to manage at least some aspect of one or more services of or enabled by a manageable device and the term "command" refers to any management command or primitive, on the basis of which a management action can be effected in the managed device. Management of a service typically involves management of a particular software application providing the service, thus the service management may include application management. The specification of a service management command on the basis of one or more device management commands is to be understood broadly to refer to any kind of mapping, definition and/or identification of a service management command or a required service management operation on the basis of one or more device management commands.

The invention makes it possible to enhance device management systems, especially those including software management aspects. Higher level service management commands can be mapped to lower level device management commands, thereby enabling use of already existing management commands. These higher level management commands may be utilized to manage software components, such as complete applications. It is possible to arrange the management of services from service subscription to service un-subscription. The present service and device management features may be utilized to manage any assets that have impact to a service/application of the managed device.

In one embodiment a service management command is for managing a service management level deployment component. The deployment component may represent a group of manageable items controlling a service. Thus it is possible to manage only parts of the service and to enable a partial update of an application, for instance. This is a considerable improvement as compared to techniques enabling updates of whole software of the managed device, for instance.

BRIEF DESCRIPTION OF THE FIGURES

The invention is now described in greater detail by means of some embodiments and with reference to the attached drawings, in which.

DETAILED DESCRIPTION OF THE INVENTION

One embodiment of the invention will be described in the following in a system supporting OMA device management; it should, however, be noted that the invention can be applied to any device management system in which device management objects can also be organized in structures other than tree structure.

Items managed in a device management client device are arranged as device management objects. The device management objects are entities that can be managed by device management commands to the device management client. A device management object can for instance be a number or a large entity, such as a background image or a screensaver. At least some of the device management objects can be standardized entirely or partly; OMA DM device management standards include three standardized device management objects at the moment.

Figure 1:
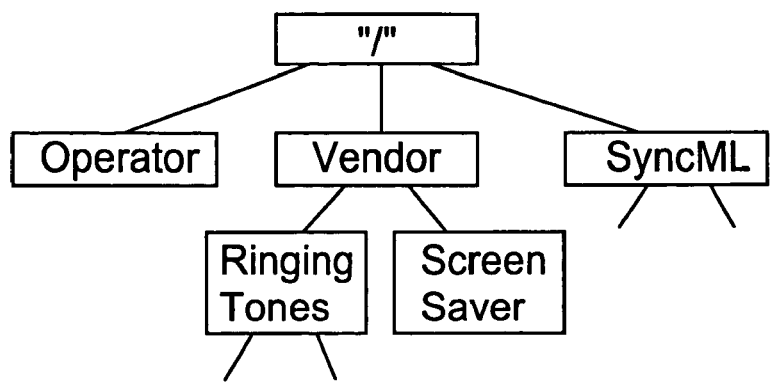
FIG. 1 illustrates a management tree.

In OMA device management, the device management objects are arranged in a management tree, which is illustrated in FIG. 1. The management tree is made up of nodes and defines at least one device management object formed of one or more nodes or at least one parameter of a node. The following examines nodes that form management objects. A node can be an individual parameter, sub-tree or data collection. For instance, a "Vendor" node is an interior node, because it has child objects, "ScreenSaver" and "RingingTones". "ScreenSaver" is a leaf node, because it does not have child objects. "RingingTones" is also an interior node, because it has child objects. The node may comprise at least one parameter that may be a configuration value or a file, such as a background image file in the "ScreenSaver" node. The data contents of the node can also be a link to another node. Each node can be addressed by a uniform resource identifier (URI). URI of a node is formed starting from the root "/", and when proceeding along the tree, each node has a name that is added to the earlier ones using "/" as the separator. For instance, the node "RingingTones" can be addressed by URI "/Vendor/RingingTones/". The nodes can be fixed or dynamic. The device management client or manager can add dynamic nodes to the management tree.

Figure 2:
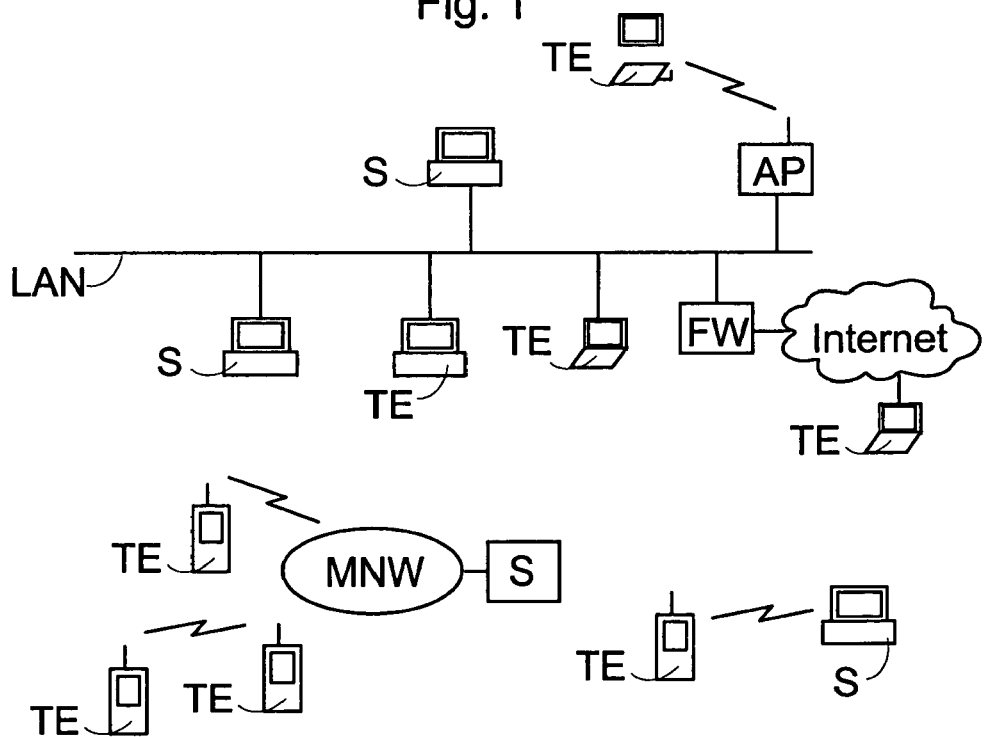
FIG. 2 illustrates some networking scenarios in which the present service management system could be applied.

FIG. 2 illustrates a networked system. A network manager or a PC typically serves as a server S. A mobile station, PC, laptop computer, or PDA (Personal Digital Assistant) device typically serves as a terminal TE. In the following embodiments, it is assumed that for device management, the terminal TE serves as the device management client and the server S as the device management manager. The server S can manage several clients TE.

FIG. 2 shows two examples, in the first of which the clients TE and the management servers S are connected to a local area network LAN. A client TE connected to the network LAN comprises a functionality, such as a network card and software controlling data transmission, for communicating with the devices in the network LAN. The local area network LAN can be any kind of local area network and the TE can also be connected to the server S through the Internet, typically using a firewall FW. The terminal TE can also be connected to the local area network LAN wirelessly through an access point AP.

In the second example, the client TE communicates with the server S through a mobile network MNW. A terminal TE connected to the network MNW comprises a mobile station functionality for communicating wirelessly with the network MNW. There may also be other networks, such as a local area network LAN, between the mobile network MNW and the server S. The mobile network MNW can be any known wireless network, for instance a network supporting GSM services, a network supporting GPRS (General Packet Radio Service) services, a third-generation mobile network, such as a network according to the network specifications of 3GPP ($3^{rd}$ Generation Partnership Project), a wireless local area network WLAN, a private network, or a combination of several networks. One important service of the transport layer in many mobile networks is a WAP which comprises a WSP (Wireless Session Protocol) layer with which a transport service can be provided for a device management application layer in a client TE and a server S. The system then comprises at least one WAP gateway and possibly one or more WAP proxies. Other protocols can also be used for transporting device management messages. Another important transport technology that may be utilized is the HTTP (Hyper Text Transfer Protocol). The lower-layer transport techniques can be circuit- or packet-switched in accordance with the properties of an underlying mobile network MNW. In addition to the earlier examples, many other device management configurations are also possible, such as a management connection between terminals TE or a direct management connection between the terminal TE and server S by using a wireless or a wired connection without any other network elements.

Figure 3:
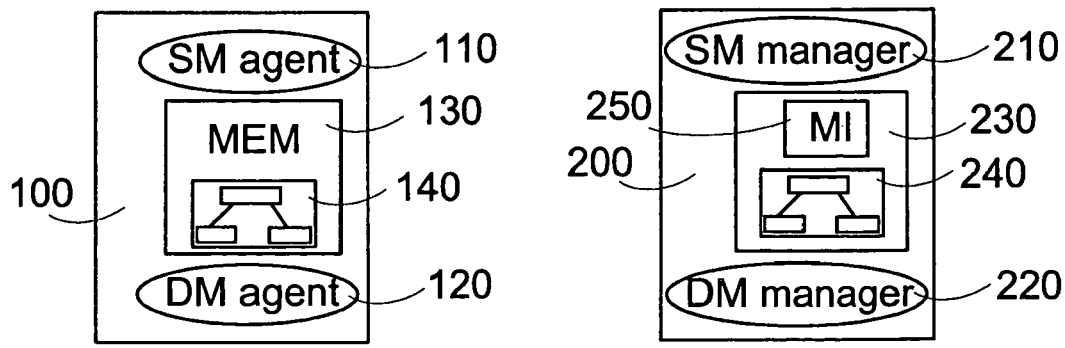
FIG. 3 illustrates data processing devices according to an embodiment of the invention.

FIG. 3 illustrates functional entities of a data processing device 100 functioning as a managed client device in view of service management and a data processing device 200 functioning as a server in view of service management. For instance, referring to FIG. 2, the terminal TE could be the client device 100 and the server S could be the server device 200. The data processing device 100 comprises a service management agent 110 (which may also be referred to as a service management client) for monitoring and/or performing service management level operations. The service management level operations may be performed by executing service management commands originally defined by a service manager 210. The service management (SM) manager (which may also be referred to as an SM server) 210 defines SM commands and may, in one embodiment, map SM commands to device management (DM) commands on the basis of mapping instructions 250 which may be stored in a memory 230.

In the present embodiment, OMA device management capabilities are used in the service management system. These OMA device management capabilities are specifically used for service management level purposes such that service management level commands are specified (between the managing device 200 and the managed device 100) by device management commands. The data processing device 100 serving as an OMA device management client comprises a DM (client) agent 120 that takes care of functions related to the device management session in the client. The DM (client) agent 120 may execute device management commands from a device management manager 220 (which may also be referred to as a device management server) for management objects in a management tree 140, deliver the DM commands to the SM agent 110, and/or perform the mapping between received DM commands and SM commands. The data processing device 200 serving as a device management manager comprises a DM manager 220 managing the OMA DM management session which, in one embodiment, may perform mapping of SM commands from SM manager 210 to DM commands. The management tree 140 is stored in a memory 130 of a data processing device 100, and information and/or device description thereof (240) may also be stored in a memory 230 of a data processing device 200. A suitable transport protocol, such as HTTP, may be used for DM level communication.

It is to be noted that the entities of FIG. 3 are only exemplary and a single entity or more than two entities may implement the functions of agents 110 and 120, for instance.

Mapping instructions (MI) 250 for arranging mapping between service management commands and device management commands are stored in the data processing device 200. The SM manager 210 may be configured to establish a device management command or primitive on the basis of a service management command and the mapping instructions 250.

In an embodiment, mapping instructions for defining service management commands for received device management commands are stored in the memory of the device 100 comprising the SM agent 110 functionality. This embodiment enables received DM commands to be converted into SM commands (for instance by the DM agent 120), which may then be carried out by the SM agent 110. Alternatively, as will be illustrated in more detail below, an SM command is defined in the client device 100 on the basis of the execution of one or more DM commands.

It is to be noted that the mapping instructions may be directly implemented in the control logic of the SM manager 210 or the DM manager 220 (or another entity performing the mapping between SM and DM commands), whereby no separate file for mapping instructions 250 needs to be stored but the mapping instructions may be stored within the program code controlling the processor of the device (200), for instance.

The (client) data processing device 100 may further comprise a separate management tree module for modifying the management tree (140) on the basis of the DM commands from the DM agent (120) and the SM commands from the SM agent (110). The (client) data processing device 100 may also comprise information on dependencies between manageable objects.

The data processing devices 100, 200 further comprise a transceiver for arranging data transfer, and a processing unit comprising one or more processors. Computer program codes executed in the processing unit may be used for causing the data processing devices 100, 200 to implement means for providing the above-illustrated entities, some embodiments of the inventive functions also being illustrated below in association with FIGS. 4, 5, 6 and 7. A chip unit or some other kind of module for controlling the data processing device 100 and/or 200 may, in one embodiment, cause the device to perform the inventive functions. The module may form part of the device and could be removable, i.e. it can be inserted into another unit or device. Computer program codes can be received via a network and/or be stored in memory means, for instance on a disk, a CD-ROM disk or other external memory means, where from they can be loaded into the memory of the data processing devices 100, 200. The computer program can also be loaded through a network by using a TCP/IP protocol stack, for instance. Hardware solutions or a combination of hardware and software solutions may also be used to implement the inventive functions. It is to be noted that the mapping instructions and the manageable objects may be stored in internal memory or external memory (for instance a removable memory card or an IC card) of the data processing device 100, or in an external storage.

Figure 4A:
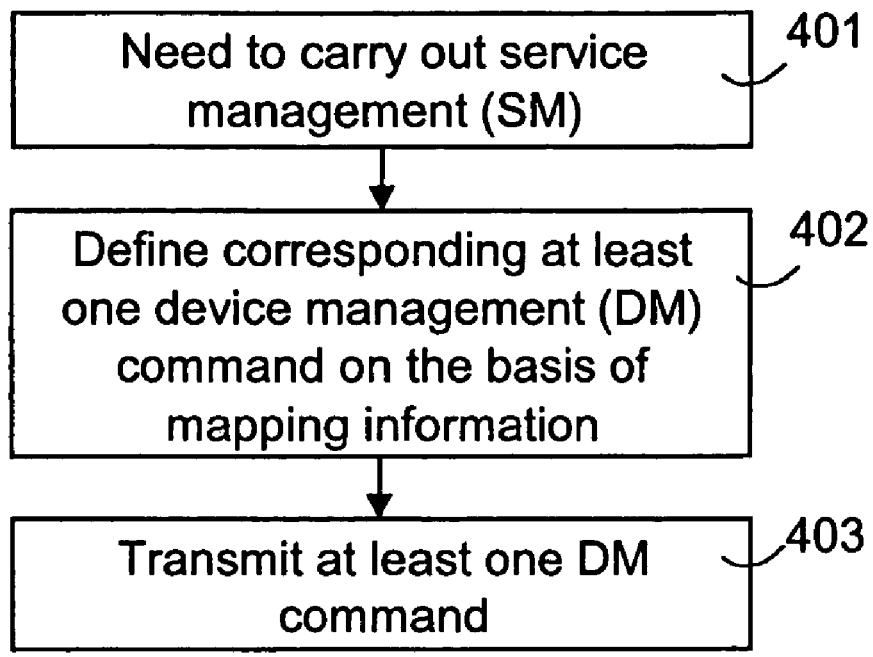
FIGS. 4a and 4b illustrate a method according to an embodiment of the invention.

FIG. 4a illustrates a method of an embodiment which can be performed in the management server device 200. In step 401, a need exists to perform service management (SM) for the managed device 100 and an SM command is defined. This need may arise based on an upper layer command, or a client device (100) request, for instance. The server device 200 may comprise a mapping function on the basis of which one or more SM level commands (which may be referred to as primitives) are defined in response to such an upper layer command. At least one device management (DM) command is defined on the basis of the one or more SM commands and mapping instructions 250 in step 402. The defined DM command(s) is/are then transmitted in step 403 to the managed device 100.

In one embodiment, a service management command comprises a plurality of subtasks and is mapped by the server 200 into a plurality of device management commands.

In one embodiment, the service management manager 210 defines the one or more DM commands and forwards them to the DM manager 220 which communicates the DM command(s) using a DM protocol to the DM agent 120 in the managed device 100. In this embodiment, the DM functions are used for serving the transmission of SM level commands. Thus, from the point of view of protocol layers, the DM layer is below the SM layer and uses transport services of an underlying transport protocol layer, such as the HTTP. Alternatively, the DM manager entity 120 may be configured to perform the mapping 402 between the SM and DM commands.

Figure 4B:
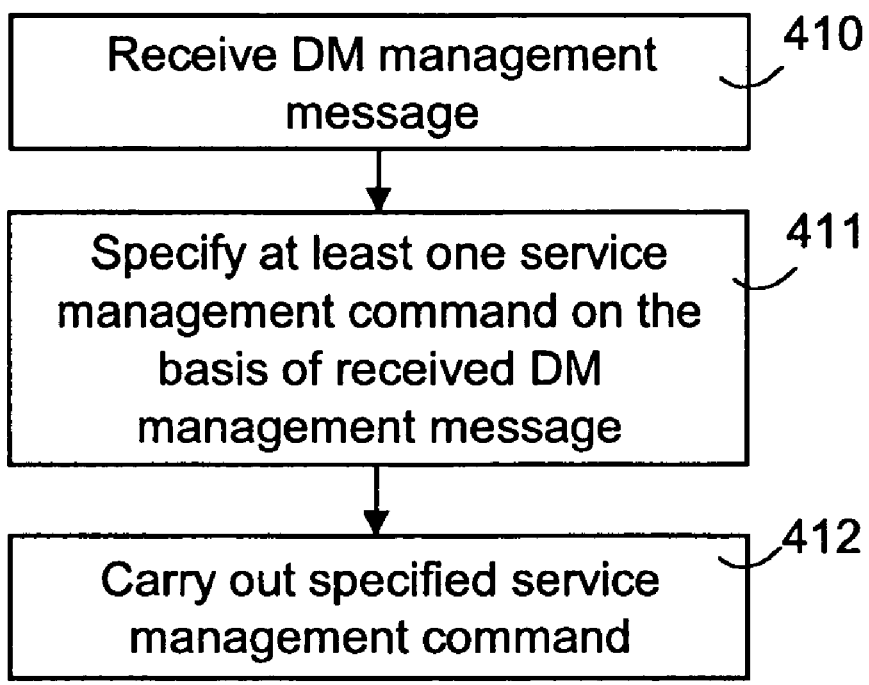

FIG. 4b illustrates a method of an embodiment which can be performed in the management client device 100. A DM message is received in step 410. The receiving device 100 is configured to specify 411 at least one service management (SM) command on the basis of the at least one DM command in the received DM command message. The SM command may then be carried out in step 412, as a result of which the management tree 140 may be modified 404 in the client device 100. The SM agent 110 may be configured to modify the management tree 140 in accordance with the service management command. It is to be noted that further actions besides step 412 may also be performed. For instance, before modifying the management tree for deactivating a manageable SM level item, running processes are checked and a process related to the item is ended.

In one embodiment, an SM command is mapped to at least one DM command such that the execution of the DM command in the managed device 100 causes identification and/or execution of the SM command. Further, the SM command may be identified on the basis of one or more modifications in the management tree 140 on the basis of the execution of the DM command by the DM agent 120. Thus, the DM command(s) is/are defined in step 402 on the basis of the mapping instructions 250 such that the SM command is identified on the basis of the execution of the DM command(s). The DM agent 120 may carry out the one or more received device management commands.

In one embodiment, the DM client 120 receives the DM message and also performs step 411. The DM client 120 thus defines 411 a corresponding SM command for the received DM command and may forward the defined SM command or indicate the required SM command to the service management agent 110. Thus, the DM agent 120 may be configured to notify the SM agent 110 on the basis of the one or more received device management commands. The SM agent 110 may then carry out the one or more service management commands on the basis of the notification from the DM agent 120. For instance, the DM agent 120 may on the basis of a target node or an area in the management tree 140 identified in the received DM command, notice that an SM command needs to be defined.

The DM agent 120 may perform the DM command on a node controlled by the SM agent 110 in the DM tree 140. In an embodiment, the SM agent 110 is configured to detect a modification in the management tree 140 due to execution of one or more device management commands. The SM agent is thus triggered to initiate an action to carry out an SM level management action, see for instance the use of "Local Operations" node illustrated below. For instance, the SM agent 110 may be configured to follow one or more nodes of the management tree 140 and detect an execution command for such a node, thereby identifying the required SM command.

The SM agent 110 may be configured to further modify the management tree 140 in step 412 in accordance with the derived service management command. In a further embodiment, the received device management command comprises a plurality of subtasks and is mapped by the SM agent 110 into a plurality of service management commands.

In an alternative embodiment the DM agent 120 merely delivers the received DM command to the SM agent 110. The SM agent 110 may then define 411 an SM command corresponding with the received DM command and carry out 412 the required action.

Responses to the (successfully or unsuccessfully) carried-out SM commands may be defined using reversely the above-illustrated features. This means that the SM client 110 may define an SM response to an SM command, based on which one or more DM commands are defined. The DM commands are transmitted to the DM manager 220, and one or more SM commands are then defined for (or by) the SM manager 210. Alternatively, response DM commands are directly established, without specific SM response commands by the SM agent 110 or the DM agent 120 on the basis of the execution of the SM and/or DM commands.

The management system is configured to support a number of management commands in order to deliver and manage services, for instance native applications and/or application components. In one embodiment, the following SM commands or primitives are supported: service or application inventory, delivery, installation, activation/deactivation (not necessary for all services/applications), update, and removal. These commands may be utilized in the above-illustrated method features, but it is to be noted that the scope of the invention is not limited to any particular commands, and any forthcoming command types may also be used. In one embodiment, an inventory of existing deployment components is made before any other SM management commands are defined by the SM manager 210.

The mapping instructions 250 comprise DM commands or primitives corresponding with the SM level commands, in the present embodiment with the above SM level primitive. Conversely, the mapping information in the client device 100 may indicate appropriate SM level commands for received DM level commands. In one embodiment, an SM level primitive is implemented by a series of DM level commands and thus also a sequence of DM level commands needs to be received and possibly also executed before an SM level command may be specified.

The SM level command message may, in an alternative embodiment, be encapsulated with the one or more device management commands corresponding to the required SM level command or action. Thus, the SM command has already been defined in the DM message and the managed device 100 only needs to retrieve the SM command from the message. With this embodiment, it is possible to arrange the execution of the received SM command in the client device 100 such that no specific mapping instructions are required in the client device 100.

In transmission of the DM commands it is possible to utilize at least some of the features of the OMA specifications; for a more detailed description of the OMA device management protocol and other commands, for instance, reference is made to the OMA specification "*SyncML Device Management Protocol*", version 1.1.2, 12 Jun. 2003, 41 pages, and the OMA specification "*SyncML Representation Protocol Device Management Usage*", version 1.1.2, 12 Jun. 2003, 39 pages. In chapter 6.5, the latter specification defines the different protocol operation elements with which the DM manager 220 and/or the SM agent 110 may define the DM commands to the management tree 140 of the managed client device 100. The OMA DM specification "*SyncML Device Management Tree and Description*", version 1.1.2, chapter 9.3.4 describes the current management tree related features. In one scenario, conventional OMA DM procedures are applied between the DM manager 220 and the DM agent 120 for configuration management, i.e. for setting appropriate configuration parameters, and the present SM procedures are applied for management of entire applications or at least application portions, and services thereof, covering for instance installation and updates instead of merely setting appropriate settings.

The SM level entities (SM manager 210 and the SM client 110) may be configured to use at least some of the DM layer services, in the present embodiment the OMA DM services, specified in the OMA DM specifications. Besides the above-illustrated device management features, OMA DM security and session management features may be utilized, for instance.

In an embodiment, the service management system employs deployment components for controlling some of manageable items controlling a service in the client device 100. A deployment component is an abstraction model dedicated especially for service management (SM) level management functions, and represents a group of manageable items of a service. As an application may provide a specific service, a deployment component may thus represent a group of manageable items of an application. This embodiment provides flexibility for service management operations, and closely-related manageable items may be gathered as a single deployment component.

Figure 5:
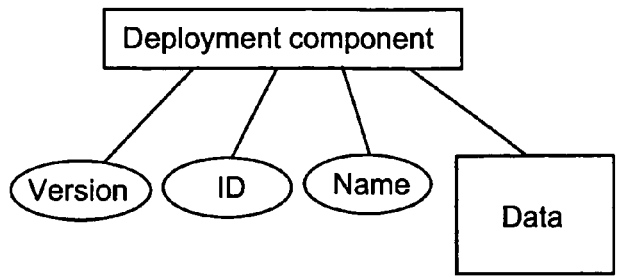
FIG. 5 illustrates a deployment component.

For instance, a deployment component can be an executable, a library, a setting, a resource, a UI element, a certificate, or a license. A deployment component may be associated with a predetermined number of states. A current state of the deployment component may be changed by atomic state transfer primitives. The deployment component may be an independent file, an .SIS file, a .CAB file, a .JAR file, or a .ZIP file, for instance. At least some of the following metadata attributes can be determined in a management tree 140 for a deployment component, and also in a delivery package from the DM manager 220 comprising one or more deployment components: Version, identifier, name (Displayable name for the component), type (If not part of the component data content), size, and location. One example of a deployment component information is illustrated in FIG. 5. The deployment components may be bundled into a delivery package between the SM manager 210 and the SM agent 110, optimised for delivery purposes (for instance compressing or DRM (Digital Rights Management)). The SM system keeps a record of deployment components and their status, in the present embodiment by the management tree 140. The service management SM commands (see steps 401 and 412 in FIGS. 4a and 4b) from the SM manager 210 to the SM agent 110 are thus addressed to one or more deployment components.

In one embodiment, at least one node is stored in the management tree 140 for a deployment component. This embodiment enables the use of management tree 140 also for service management purposes, more precisely for representing service management items or objects, in the present embodiment deployment components. These deployment component nodes may be modified using SM commands which may be derived (by the SM agent 110 or the DM agent 120) from one or more DM level commands on the basis of the mapping instructions. As already mentioned above, the service management agent 110 may be configured to maintain information on deployment components in the management tree 140.

According to an embodiment, the deployment component is associated in the management tree 140 with a state describing the current status of the deployment component. Thus, state information can be easily obtained for a deployment component from the same management tree 140. In a further embodiment, the management tree 140 comprises a node for at least some of possible states such that the deployment component is stored under a node described the current state. For instance, suitable states could be "Active", "Inactive", and "Delivered". This embodiment is illustrated in the exemplary management tree in FIG. 6, wherein deployment components may be stored under an appropriate state node. If a deployment component is associated with the state "Delivered" (in the example of FIG. 6 stored under the "Delivered" node), the deployment component has been delivered to the client device 100 but has not been installed. After installation, the component would have the state "Inactive".

Figure 6:
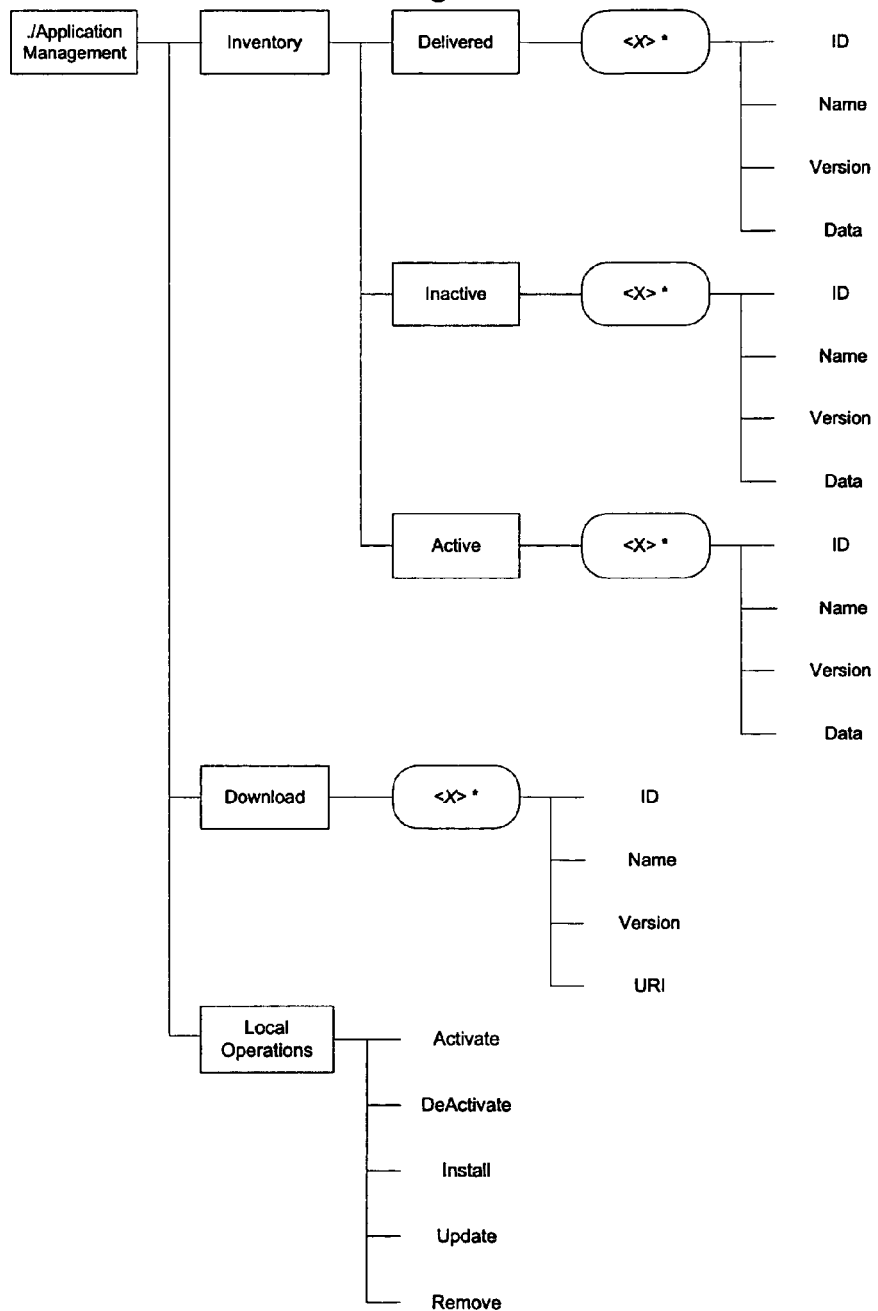
FIG. 6 illustrates a management tree configuration according to an embodiment of the invention.

Further, the service management system may provide means for making an inventory of the existing deployment components. In one embodiment, the inventory is carried out by the SM agent 110 and the results of the inventory, i.e. information indicating the existing deployment components in the device 100, are returned to the DM client 120 which forwards them by a DM message to the DM manager 120. The DM manager 120 forwards information on the existing deployment components to the SM manager 210. The inventory may be carried out by traversing through the management tree 140, searching for deployment components. The management tree 140 may comprise a specific inventory node for arranging an inventory of the deployment components. In one possible implementation scenario, nodes for each possible state are sub-nodes of an inventory node, as illustrated in FIG. 6. The managing device 200 may be configured to get an inventory by specifying a DM command (derived from a SM level inventory request) to the inventory node, and the deployment component inventory may be returned by the managed device 100 by utilizing DM procedures. It is to be noted that the states may also be implemented in other ways, for instance under a node other than the "Inventory" node, or state information may be stored in a deployment component node.

The inventory means enable a flexible way for advertising the already available services in the client device 100 for potential successors in the service-value-chain in a controlled way.

In one embodiment, the management tree 140 comprises a node "Local Operations" for arranging (local) operations for the management tree 140.

As illustrated in the example of FIG. 6, a sub-node may be stored for each local operation in the management tree 140. In response to an execution command to an operation sub-node, an associated local operation is carried out and, as a result, one or more other nodes in the management tree 140 are modified. In one embodiment, the DM command is defined in the server device 200 such that the DM agent 120 issues an execution command to a local operation sub-node. On the basis of this execution command, the SM agent 110 is configured to carry out the actual (SM level) local operation associated with the local operation sub-node and modify the management tree 140 appropriately. Thus, at least one required local operation to a second node in the management tree 140 may be specified in the managed device 100 on the basis of a received management command to a first node (for instance the specific local operations node). The DM command (addressed to the local operations node) may thus comprise a URI (uniform resource identifier) or another identifier of the node to which the local operation is to be addressed. The DM command may also comprise other information specifying the local operation.

For instance, a sub-node is arranged for an activation operation ("Activate"). In response to an execution command to this sub-node, at least one node comprising a deployment component or another manageable object is set to an active state. Referring to the state embodiment also illustrated in FIG. 6, a deployment component under the "Inactive" node would then be moved under the "Active" node.

Other exemplary local operations shown in FIG. 6 are "Deactivate" for deactivating an object or a component, "Install" for installing an object or a component, "Update" for updating an object or a component, and "Remove" for removing an object or a component.

It is to be noted that instead of the example in FIG. 6, operations in the management tree 140 may be carried out without local operations and the "Local operations" node in the management tree. For instance, state transactions (between states "Delivered", "Inactive", and "Active") may be carried out by direct "ADD" and "DELETE" commands to the respective nodes.

Figure 7:
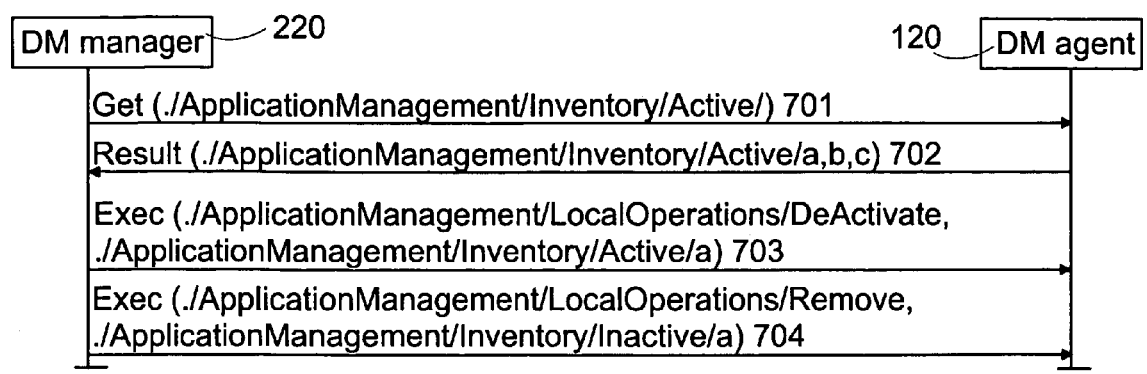
FIG. 7 is a signalling diagram illustrating a service management scenario according to an embodiment of the invention.

FIG. 7 illustrates one example relating to uninstalling of an existing service in the managed client data processing device 100, and reference is also made to the management tree structure of FIG. 6. As there is a need to find out the active deployment components in the managed device 100, the SM manager 210 may define an exemplary SM level command "Make Component Inventory". By this command the SM manager 210 requests a component inventory. This SM command is mapped to a DM GET request indicating the Inventory/Active node in the management tree 140 as illustrated. The DM command GET sub-tree is carried out on this node, whereby at least one of components is retrieved from the management tree 140 (either by the SM agent 110 or the DM agent 120). The device 100, in response to the server device 200, sends a message 702 comprising a list of existing components. The SM manager 210 defines an SM level "DeActivate" command, based on which a DM level execution message 703 to the "Local Operations/DeActivate" node is defined and transmitted to the managed device 100. Based on this DM command, an execution command is carried out on this node in the management tree 140. In response to this execution command (or possibly a notification from the DM agent 120), the SM level deactivation command is carried out, on the basis of which the SM agent 110 relocates the component "a" under the "InActive" node in the "Inventory" node. Similarly, in order to carry out the SM level "Remove" command for removing the component "a", a DM level execution command 704 for "Local Operations/Remove" node is defined and transmitted to the managed device 100. Based on the DM execution command, the SM command for carrying out the local removal operation is specified. The SM agent 110 removes the component "a" from the "Inactive" node (under which it was moved in response to the command 703) in the management tree 140. The component "a" has then been removed from device 100. For the sake of clarity, FIG. 7 shows no logical commands between the SM agent 110 and the SM manager 210, neither are responses to messages 703 and 704 shown.

In the following, some service management uses are illustrated.

Corporate IM (IT Management) installs a new business application.

Corporate IM updates an existing business application.

Corporate IM analyzes a virus definition file in a manageable device.

Service provider updates an existing plug-in for a browser.

Service provider updates a messaging application UI (User Interface).

Service provider controls game service: According to the terms of a service agreement, the service provider de-activates a service and the service is activated only after the user pays the bill.

Corporate IM reinstalls a faulty application.

Service provider installs a new codec for a media player.

It is to be noted that instead of the above-illustrated corporate IM and service provider entities, other kinds of administrative entities may be in control of the management server device 200 and manage the client device 100 by the present SM and/or DM features. For instance, network operators or manufacturers could also be such administrative entities.

According to an aspect of the present application, at least two different management methods are available for the device (200) functioning as a service management server. This means that the management server device (200) may select an appropriate management method for managing the client device (100), i.e. for delivering a managed asset, such as a deployment component, to the client device. This selection may be carried out on the basis of the properties of the managed asset to be delivered, on the basis of the properties of the manageable device and/or some other decision criterion.

According to an embodiment, at least two different management channels are applied. The term "channel" herein generally refers to a particular delivery method for arranging delivery of a management command and/or asset to a managed device.

In one embodiment, a first managed asset is delivered to the managed device (100) by direct delivery, i.e. by transmitting a command by a (DM or SM) management protocol from the managing device (200). Another alternative (for a second managed asset) is to apply indirect delivery, whereby only a direct or an indirect reference to the managed asset is first delivered to the managed device. This reference may be transmitted by a management protocol. The managed device may then retrieve the managed asset, for instance an automatically installing software update package, on the basis of the reference. The reference may be a URI to the location from which the managed asset is to be retrieved. Selection of a management method may be determined as described herein, and/or as described in U.S. patent application Ser. No. 10/966,745 entitled "Selection of Management Method," filed on Oct. 15, 2004, the content of which is incorporated herein by reference in its entirety. Further, determining how local operations may be arranged in a management system may be determined as described herein, and/or as described in U.S. patent application Ser. No. 10/966,503 entitled "Arranging Management Operations in Management System" filed on Oct. 15, 2004, the content of which is incorporated herein by reference in its entirety.

In a further embodiment, again referring to FIG. 6, the management tree 140 is provided with a "Download" node for storing references to the managed assets. In FIG. 6, one exemplary entry including an identifier, a name, a version and a URI for such a referred-to managed asset is illustrated. The agent (110 or 120) may retrieve the reference from this node in response to an external or internal trigger, for instance an input from the user or an installation command from the managing device (200). Downloading of the managed asset may be activated in the embodiment of FIG. 6 by sending an execution command for an entry of the managed asset in the "Download" node. The managed asset can then be retrieved from the URI and possibly stored in the "Delivered" node. Next, already illustrated further features may be applied to the managed asset, for instance the "Install" command may be executed. It is to be noted that the information in the entry, i.e. a sub-node of the "Download" node, is only an example. For instance, if the URI or some other type of identifier identifying the location of the managed asset does not indicate the appropriate retrieval method for retrieving the object, a specific "Type" information attribute indicating the retrieval method, such as "HTTP", could be stored in an entry for a referred managed asset. This feature may be applied to service management and/or device management.

It should be noted that the embodiments described above could also be applied in any combination thereof. It is apparent to a person skilled in the art that as technology advances, the basic idea of the invention can be implemented in many different ways. The invention and its embodiments are thus not restricted to the examples described above but can vary within the scope of the claims.

The invention claimed is:

1. A data processing device, comprising:
A memory including a computer program code, and
at least one processor, the computer program code being configured, with the at least one processor, to cause the data processing device at least to:
define one or more service management commands for one or more managed devices, the one or more service management commands being a command from a service management server to a service management client to manage one or more software components;
encapsulate the one or more service management commands with one or more device management commands corresponding to the one or more service management commands, the one or more device management commands being from a device management server to a device management client of a managed device and to a node in a management structure, the node being for deployment component information, wherein the one or more service management commands are encapsulated with the one or more device management commands such that the one or more service management commands can be retrieved from the one or more device management commands at the managed device and executed by the managed device without mapping instructions at the managed device; and
control transmission of the one or more device management commands defining the one or more service management commands to the managed device, wherein the one or more device management commands are used for serving the transmission of the one or more service management commands.

2. The data processing device according to claim 1, wherein a service management server is further configured to define the device management commands.

3. The data processing device according to claim 1, wherein the device management server is configured to define the one or more device management commands.

4. The data processing device according to claim 1, wherein the one or more service management commands comprises a plurality of subtasks and is mapped into a plurality of device management commands.

5. The data processing device according to claim 1, wherein
the data processing device is configured to address the device management command to a specific node in the management structure of the managed device for inventory of the deployment components.

6. The device of claim 1, wherein the management structure is an Open Mobile Alliance device management tree and the device management commands are Open Mobile Alliance device management commands.

7. A data processing device, comprising:
A memory including a computer program code, and
at least one processor, the computer program code being configured, with the at least one processor, to cause the data processing device at least to:
receive by a device management client one or more device management commands of a device management server to a node in a management structure for deployment component information;
retrieve one or more service management commands from the one or more received device management commands, the one or more service management commands being from a service management server to a service management client to manage one or more software components, wherein the one or more device management commands are used to encapsulate the one or more service management commands, wherein the one or more service management commands are encapsulated with the one or more device management commands such that the one or more service management commands can be retrieved from the one or more device management commands at the service management client and executed by the service management client without mapping instructions at the service management client; and
at least one of monitor and perform the one or more service management commands.

8. The data processing device according to claim 7, wherein the service management client is configured to carry out the one or more service management commands on the basis of a modification in the management structure due to execution of the one or more device management commands.

9. The data processing device according to claim 7, wherein the device management client is configured to notify the service management client on the basis of the one or more received device management commands.

10. The data processing device according to claim 9, wherein the service management client is configured to carry out the one or more service management commands on the basis of a notification from the device management client.

11. The data processing device according to claim 7, wherein the service management client is configured to modify the management structure in accordance with the specified one or more service management commands.

12. The data processing device according to claim 7, wherein in the management structure, the deployment component is associated with a state describing the current status of the deployment component.

13. The data processing device according to claim 12, wherein the management structure comprises a specific node for indicating the state of the deployment component.

14. The data processing device according to claim 7, wherein the management structure comprises a specific inventory node for arranging inventory of the deployment components, and
the data processing device is arranged to carry out inventory of existing deployment components in response to a device management command to the inventory node.

15. The data processing device according to claim 7, wherein the management structure is an open mobile alliance device management tree and the device management commands are open mobile alliance device management commands.

16. The device of claim 7, wherein the service management command is identified in the management device on the basis of one or more modifications of the management structure.

17. The device of claim 7, wherein the service management command is specified in the managed device on the basis of mapping information in the managed device and the received one or more device management commands.

18. A method comprising:
defining, by a managing device, a service management command for a managed device, the service management command being a command from a service management server to a service management client to manage one or more software components;
encapsulating the service management command with one or more device management commands corresponding to the service management command;
transmitting the one or more device management commands defining the service management command to the managed device, the one or more device management commands being from a device management server to a device management client, to a node in a management structure, the node being for deployment component information, wherein the one or more device management commands are used for serving the transmission of the service management command, wherein the one or more service management commands are encapsulated with the one or more device management commands such that the one or more service management commands can be retrieved from the one or more device management commands at the device management client and executed by the device management client without mapping instructions at the device management client.

19. The method according to claim 18, wherein the device management command is addressed to a specific node in the management structure of the managed device for inventory of the deployment components.

20. The method according to claim 18, wherein the management structure comprises a specific node for indicating the state of the deployment component.

21. A non-transitory data storage medium for storing a computer program, the computer program comprising computer program code for, when executed in a processor of a data processing device, causing the data processing device to:
define a service management command for a managed device, the service management command being a command from a service management server to a service management client to manage one or more software components; and encapsulate the service management command with one or more device management commands corresponding to the service management command, the one or more device management commands being from a device management server to a device management client, to a node in a management structure, the node being for deployment component information, wherein the one or more device management commands are used for serving the transmission of the service management command, wherein the one or more service management commands are encapsulated with the one or more device management commands such that the one or more service management commands can be retrieved from the one or more device management commands at the device management client and executed by the device management client without mapping instructions at the device management client.

22. A non-transitory data storage medium for storing a computer program, the computer program comprising computer program code for, when executed in a processor of the data processing device, causing the data processing device to:
retrieve one or more service management commands from one or more received device management commands from a device management server to a device management client and to a node in a management structure for deployment component information, the one or more service management command being a command from a service management server to a service management client to manage one or more software components, wherein the one or more device management commands are used for serving the transmission of the service management command, and wherein the one or more service management commands are encapsulated with the one or more device management commands such that the one or more service management commands can be retrieved from the one or more device management commands at the service management client and executed by the service management client without mapping instructions at the service management client; and
at least one of monitor and perform the one or more service management commands.

23. A method, comprising:
receiving, by a device management client, one or more device management commands from a device management server and to a node in a management structure for deployment component information;
retrieving one or more service management commands from the received one or more device management commands, the one or more service management commands being from a service management server to a service management client to manage one or more software components, wherein the one or more device management commands are used for serving the transmission of the service management command, wherein the one or more service management commands are encapsulated with the one or more device management commands such that the one or more service management commands can be retrieved from the one or more device management commands at the service management client and executed by the service management client without mapping instructions at the service management client; and
executing the retrieved one or more service management commands in the managed device.

24. The method of claim 23, wherein
the device management client carries out the one or more received device management commands, and
the service management client carries out the retrieved one or more service management commands on the basis of a modification in the management structure due to execution of the one or more device management commands.

25. The method according to claim 23, wherein the management structure comprises a specific inventory node for arranging inventory of the deployment components, and
inventory of existing deployment components is carried out in response to a device management command to the inventory node.

26. The method according to claim 23, wherein the management structure comprises a specific node for indicating the state of the deployment component.

* * * * *